(12) United States Patent
Choi et al.

(10) Patent No.: US 9,603,014 B2
(45) Date of Patent: Mar. 21, 2017

(54) POWER SYSTEM

(71) Applicant: LSIS CO., LTD., Anyang-si, Gyeonggi-do (KR)

(72) Inventors: Won Seok Choi, Anyang-si (KR); Chul Hwan Choi, Uiwang-si (KR); Jong Ho Park, Gwangmyeong-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/620,012

(22) Filed: Feb. 11, 2015

(65) Prior Publication Data

US 2015/0312756 A1 Oct. 29, 2015

(30) Foreign Application Priority Data

Apr. 29, 2014 (KR) .................. 10-2014-0051553
Apr. 29, 2014 (KR) .................. 10-2014-0051554

(51) Int. Cl.
*H04L 12/04* (2006.01)
*H04L 12/24* (2006.01)
(Continued)

(52) U.S. Cl.
CPC .......... *H04W 12/04* (2013.01); *H04B 5/0031* (2013.01); *H04B 5/0037* (2013.01);
(Continued)

(58) Field of Classification Search
CPC ..... H04B 5/0031; H04B 5/0037; H04L 41/00; H04L 43/00; H04L 63/067; H04W 12/04; H04W 4/008
See application file for complete search history.

(56) References Cited

U.S. PATENT DOCUMENTS 5,299,263 A 3/1994 Beller et al.
7,567,665 B2 * 7/2009 Nattkemper ............. G06F 1/28
 307/116
(Continued)

FOREIGN PATENT DOCUMENTS

CN 202126625 1/2012
CN 202994209 6/2013
(Continued)

OTHER PUBLICATIONS

European Patent Office Application Serial No. 15164837.5, Search Report dated Sep. 2, 2015, 5 pages.
(Continued)

*Primary Examiner* — Lewis West
(74) *Attorney, Agent, or Firm* — Lee, Hong, Degerman, Kang & Waimey (57) ABSTRACT

A power system is provided. The power system includes a power device group including a power device, at least one communication device mutually connected through a short range communication network, and a monitoring/controlling device connected to the communication device in a wired manner and transmitting and receiving state information data and control data of the power device through the communication device. The communication device includes a first communication unit connecting the communication devices through the shore range communication network, and a second communication unit connected to the monitoring/controlling device in a wired manner.

4 Claims, 7 Drawing Sheets

(51) Int. Cl.
*H04L 12/26* (2006.01)
*H04L 29/06* (2006.01)
*H04B 5/00* (2006.01)
*H04W 4/00* (2009.01)
*H04W 12/04* (2009.01)

(52) U.S. Cl.
CPC .............. H04L 41/00 (2013.01); H04L 43/00 (2013.01); H04L 63/067 (2013.01); H04W 4/008 (2013.01)

(56) References Cited

U.S. PATENT DOCUMENTS

| | | | | |
|---|---|---|---|---|
| 7,825,793 | B1* | 11/2010 | Spillman | G08B 13/1966 340/507 |
| 2002/0090089 | A1 | 7/2002 | Branigan et al. | |
| 2009/0184835 | A1* | 7/2009 | Deaver, Sr. | G08B 25/06 340/660 |
| 2011/0115642 | A1* | 5/2011 | Gilbert | G01R 22/066 340/870.02 |
| 2012/0054540 | A1* | 3/2012 | Howard | G06F 9/4401 714/6.12 |
| 2012/0307646 | A1* | 12/2012 | Xia | H04W 4/008 370/241 |
| 2013/0073060 | A1* | 3/2013 | Dawley | H02J 13/001 700/20 |
| 2013/0308437 | A1 | 11/2013 | Hayakawa | |
| 2014/0201089 | A1* | 7/2014 | Ling | G06Q 10/20 705/305 |
| 2016/0195864 | A1* | 7/2016 | Kim | G05B 15/02 709/221 |

FOREIGN PATENT DOCUMENTS

| | | |
|---|---|---|
| EP | 1770900 | 4/2007 |
| WO | 2012/166250 | 12/2012 |

OTHER PUBLICATIONS

European Patent Office Application Serial No. 15164837.5, Search Report dated Jan. 4, 2016, 11 pages.

* cited by examiner

POWER SYSTEM

CROSS-REFERENCE TO RELATED APPLICATIONS

Pursuant to 35 U.S.C. §119(a), this application claims the benefit of earlier filing date and right of priority to Korean Patent Application Nos. 10-2014-0051553 and 10-2014-0051554 filed on Apr. 29, 2014, the contents of which are all hereby incorporated by reference herein in their entirety.

BACKGROUND

The present disclosure relates to a power system.

A power system may be configured with a monitoring/control device, a communication device, and a power facility. The monitoring/control device may acquire various status data and error data created in the power facility through a communication device, and output control data corresponding thereto to the corresponding power facility. At this point, the monitoring/control device and the communication device may be connected in a wired manner to perform communication and may secure reliability of communication and data through closed-type communication.

However, the communication device may not check malfunction thereof, and the wired communication is not allowed at the time of failure. Accordingly, it is not possible to receive commands from the monitoring/control device connected to the outside in the wired manner and to recover to a normal state. In this case, a field manager may have difficulty in rapid failure determination on the communication device, and need to perform a procedure for forced re-operation. Accordingly, detection and recovery of the device failure may lack speed and a resultant secondary accident issue may be inherent.

In addition, when the power facility, the communication device, and the monitoring/control device, which configure the power system in the wired manner, are connected wirelessly to maximize communication efficiency, communication reliability among the devices may be degraded and security may be vulnerable to an external attack through the wireless communication. Accordingly, in order to change the wired communication network to the wireless communication network and use the wireless communication, the security system is required to be applied and reliability between devices is required to be secured to transmit and receive data and cut off the outside.

SUMMARY

Embodiments provide power systems capable of detecting errors of power facilities and devices monitoring and controlling the power facilities, and easily taking measures corresponding thereto.

Embodiments also provide power systems capable of detecting communication states of devices configuring the power system and accordingly efficiently performing data transmission and reception.

Embodiments also provide power systems capable of securing reliability and maximizing data stability for wireless communication among power facilities and devices monitoring/controlling the power facilities.

In one embodiment, a power system includes a power device group including a power device; at least one communication device mutually connected through a short range communication network; and a monitoring/controlling device connected to the communication device in a wired manner and transmitting and receiving state information data and control data of the power device through the communication device, wherein the communication device includes a first communication unit connecting the communication devices through the shore range communication network, and a second communication unit connected to the monitoring/controlling device in a wired manner In another embodiment, a power system includes: a power device group including power devices; at least one communication device connected to a monitoring/controlling device through a wired or wireless communication network and transmitting a secure key and authentication data to the monitoring/controlling device; and the monitoring/controlling device connected to the communication device through the wired or wireless communication network, and creating a session key on the basis of the secure key and authentication data received from the communication device and performing authentication with the communication device on the basis of the session key.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments, examples of which are illustrated in the accompanying drawings.

A power system according to an embodiment will be described in detail with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

In addition, the terms "first" and "second" can be selectively or exchangeably used for the members. In the figures, a dimension of each of elements may be exaggerated for clarity of illustration, and the dimension of each of the elements may be different from an actual dimension of each of the elements. Not all elements illustrated in the drawings must be included and limited to the present disclosure, but the elements except essential features of the present disclosure may be added or deleted.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

A power system according to an embodiment will be described in detail with reference to the accompanying drawings.

Figure 1:
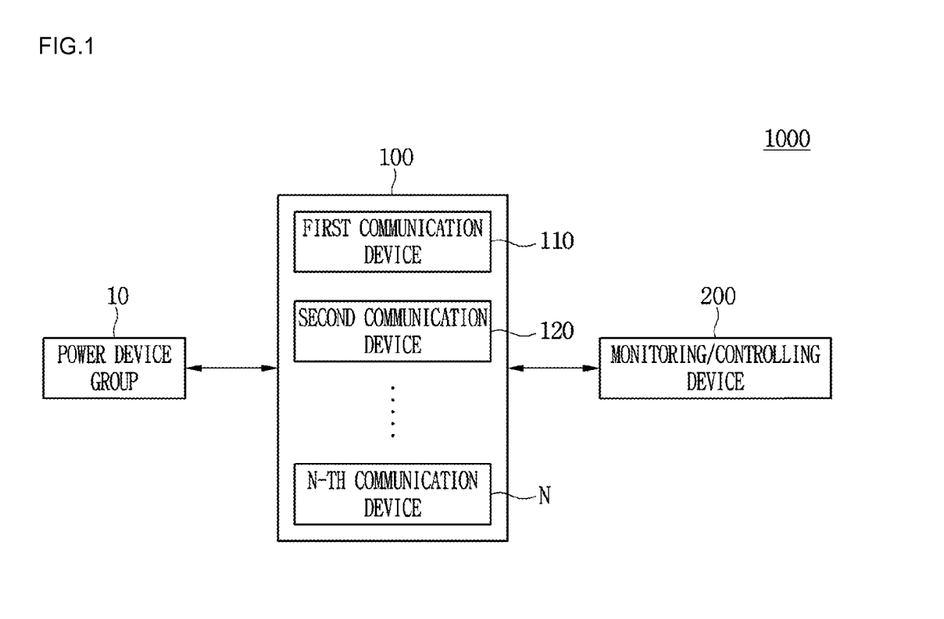
FIG. 1 is a block configuration diagram of a power system to which a first embodiment is applied.

FIG. 1 is a block configuration diagram of a power system to which a first embodiment is applied.

Referring to FIG. 1, a power system 1000 according to the first embodiment may include a power device group 10, at least one communication device 100, and a monitoring/controlling device 200.

The power device group 10 may include a plurality of power devices, each of which may be configured with various types of power devices consuming or generating power. Each power device of the power device group 10 may create state information data according to drive, and the state information data may be output to the monitoring/controlling device 200 through the communication device 100. In addition, the power devices of the power device group 10 may acquire control data from the monitoring/controlling device 200, and change or apply a control signal of an operation on the basis of the control data.

The communication device 100 may perform communication with the power devices of the power device group 10, and include a communication module capable of communicating with the monitoring/controlling device 200. The communication device 100 according to an embodiment may include a plurality of communication devices and be connected to a short range wireless communication network. The communication device 100 may be configured to correspond to the power device group 10, and communication devices (e.g., first to N-th communication devices 110 to N) may include short range communication modules respectively and perform communication using the short range communication modules with each other.

Figure 2:
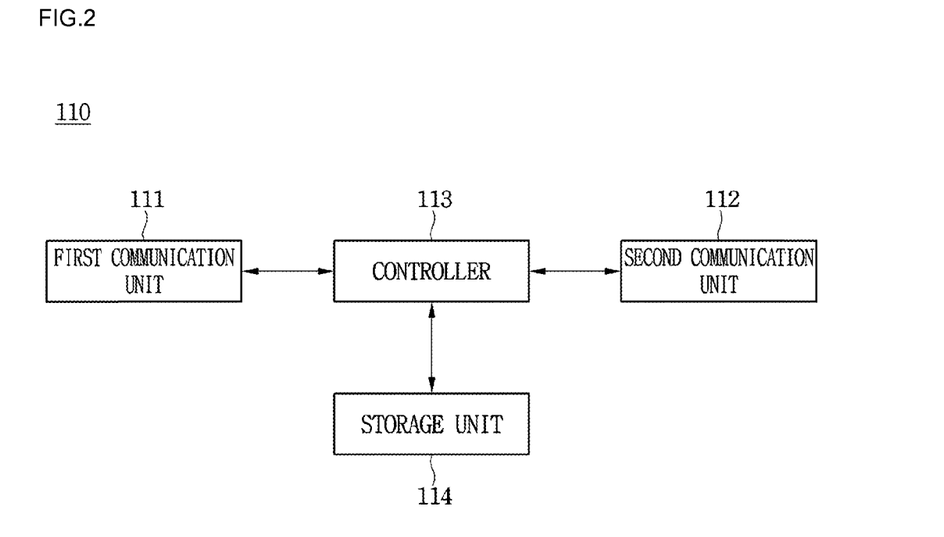
FIG. 2 is a block configuration diagram of a communication device according to the first embodiment.

FIG. 2 is a block configuration diagram of the communication device according to the first embodiment.

The communication device illustrated in FIG. 2 is described as an example of any one communication device among a plurality of communication devices connected to a power facility group according to an embodiment, each of which may have a similar configuration.

Referring to FIG. 2, the communication device 110 according to an embodiment may include a first communication unit 111, a second communication unit 112, a controller 113, and a storage unit 114.

The first communication unit 111 may include a short range communication module for performing communication among the plurality of communication devices according to an embodiment. The short range communication module capable of configuring the first communication unit 111 may use Bluetooth, Radio Frequency Identification (RFID), infrared data association (IrDA), ultra wideband (UWB), ZigBee, or the like. The first communication unit 111 may be activated for communication among the communication devices, and output a state recovery message to a corresponding communication device using the short range wireless communication by the first communication unit 111 at the time of receiving the state recovery message for a communication device in an abnormal state from the monitoring/controlling device 200 according to an embodiment.

The second communication unit 112 may include a wired communication module for performing communication with the monitoring/controlling device 200 according to an embodiment. The second communication unit 112 may transmit data acquired from the power device group 10 to the monitoring/controlling device 200, or receive control data to be transmitted to a corresponding power facility of the power device group 10.

The controller 113 may perform communication between the communication devices and control so as for data received from the monitoring/controlling device 200 to be output to a corresponding destination (power device). The controller 113 may search for a corresponding communication device and output a corresponding state recovery message, when receiving the state recovery message for another communication device connected through the short range wireless communication from the monitoring/controlling device 200 according to an embodiment. In addition, the controller 113 may receive a normal state recovery message from a communication device connected through the short range communication network. At this point, the communication device may recognize a state as an abnormal state and forcibly restart (reboot) the communication device according to the state recovery message.

The storage unit 114 may store information on the power device group 10 and the monitoring/controlling device 200. The information may be identifier information on each device. In addition, the storage device 114 may store information on adjacent communication devices connected through the short range communication network. The information may include the identifier information and position information (e.g., connection information).

Figure 3:
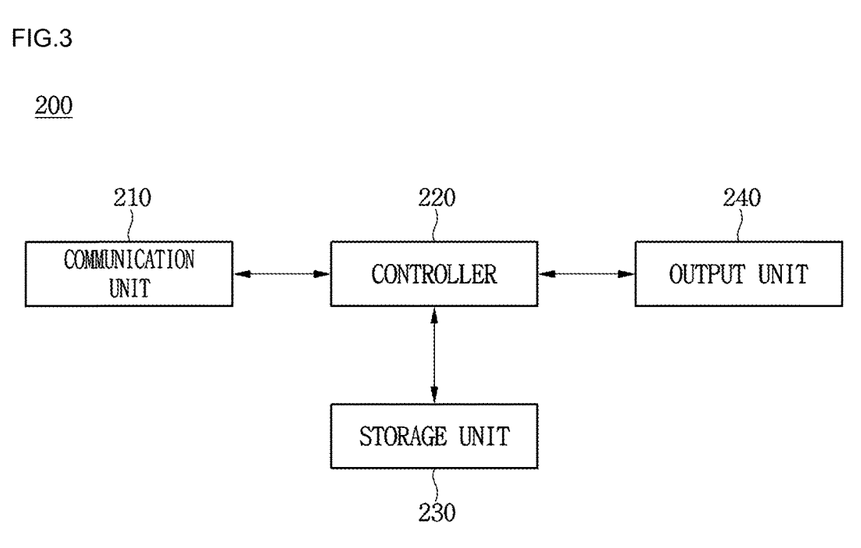
FIG. 3 is a block configuration diagram of a monitoring/controlling device according to the first embodiment.

FIG. 3 is a block configuration diagram of the monitoring/controlling device according to the first embodiment.

Referring to FIG. 3, the monitoring/controlling device 200 according to an embodiment may include a communication unit 210, a controller 220, a storage unit 230, and an output unit 240.

The communication unit 210 may include a wired communication module connectable in a wired manner with at least one communication device. In addition, the communication unit 210 may include a wireless communication module for transmitting data acquired through the communication devices to a preset destination. The communication unit 210 may acquire information on the power devices from the communication devices or acquire state information on the communication devices. The communication device 210 may allow control data for the data acquired from the power device group to be transmitted through the communication devices. Furthermore, the communication device 210 may output a state recovery message to a communication device in an abnormal state or a communication device in a normal state, which is adjacent to the communication device in the abnormal state, on the basis of state information on the communication device.

The controller 220 may create control data for a corresponding power device on the basis of the data acquired from the power device group 10 or read pre-stored control data to output the read control data. The controller 220 may acquire state information on the communication devices and create to output a normal state recovery message for the communication device in the abnormal state on the basis of the state information of the communication devices. The normal state recovery message may be allowed to be output to the communication device in the abnormal state or a communication device in the normal state, which is adjacent to the communication device in the abnormal state, according to a communication state of the corresponding communication device.

The storage unit 230 may store state data and control data of the power facility included in the power facility group 10, which are acquired through the communication device 100. In addition, according to an embodiment, the storage unit 230 may store information on the communication device and store information (e.g., identifier) on wired communication with the communication device. Furthermore, the storage unit 230 may store a recovery command message or control data corresponding to a state of the communication device.

The output unit 240 may output information on data acquired by and out from the monitoring/controlling device 200. Data output from the output unit 240 may include audio data or video data.

Hereinafter, each operation will be described in detail in accordance with the above-described configurations of the communication device 100 and the monitoring/controlling device 200.

Figure 4:
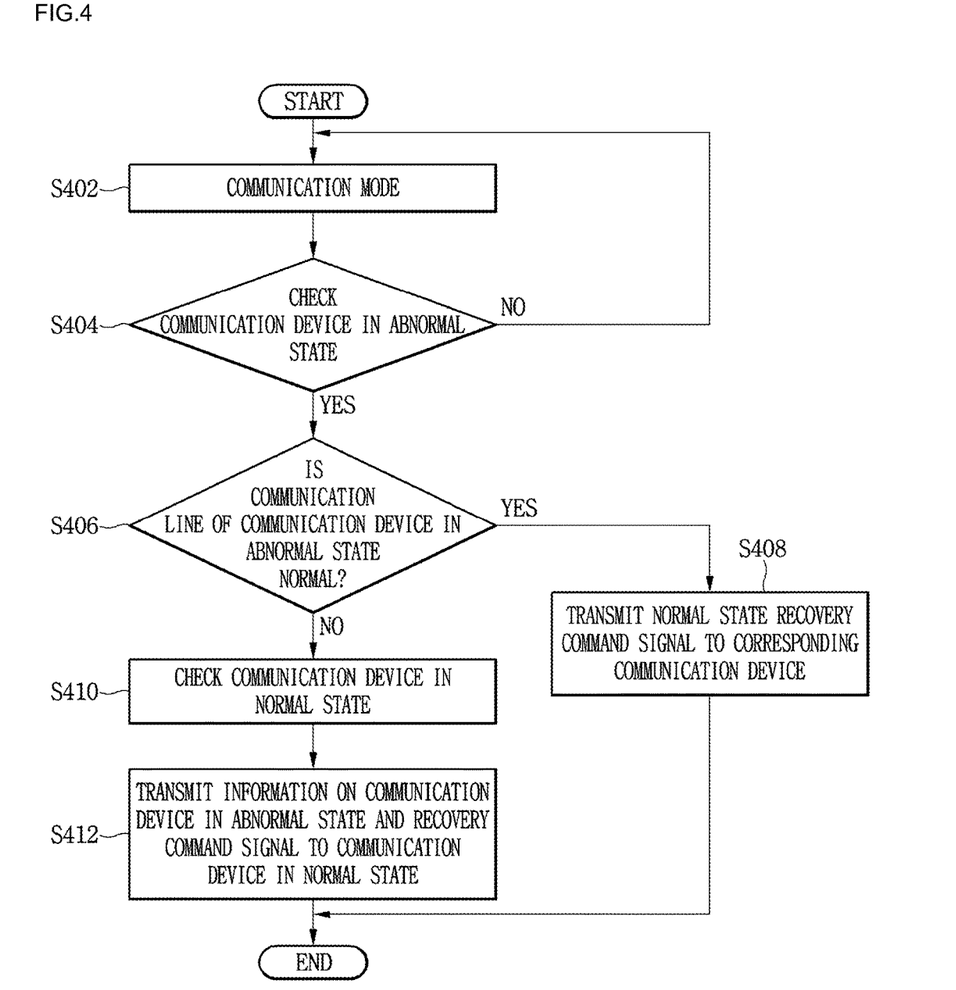
FIG. 4 is a flow chart of an operation of the monitoring/controlling device according to the first embodiment.

FIG. 4 is a flow chart of an operation of the monitoring/controlling device according to the first embodiment.

Referring to FIG. 4, the monitoring/controlling device 200 according to an embodiment may execute a communication mode in which data acquired from the power facility group 10 is received through the communication device 100 and control data corresponding to the received data is output (operation S402). At this point, the monitoring/controlling device 200 may check state information on the communication device according to the execution of the communication mode. In other words, when the communication device is configured to correspond to the power facility and errors on data reception from specific power facility are detected, an abnormal state of the corresponding communication device may be detected. Alternatively, when data of the power facility group is received or control data is output through the communication device, a response signal (e.g., ACK) may be received, and when the response signal is not received, the abnormal state of the corresponding communication device may be detected.

The controller 220 of the monitoring/controlling device 200 may constantly check whether the data or the response signal is not received through a specific communication device during executing the communication mode, and may check whether the abnormal state of the communication device occurs (operation S404).

When the communication device in the abnormal state is checked, the controller 220 may determine whether a state of a wired communication line for the corresponding communication device (the communication device in the abnormal state) is normal (operation S405). In other words, even when the communication device is in the abnormal state, the controller 220 may check whether the communication line (the wired communication line) of the communication device connecting the monitoring/controlling device 200 is in the normal state. The state of the wired communication line may be checked by outputting any data or determining whether a response signal of the already output data is received.

When the communication line in the abnormal state is normal, the controller 220 may transmit a normal state recovery command signal to the communication device in the abnormal state (the corresponding communication device) through the communication line (operation S408).

On the contrary, when the communication line of the communication device in the abnormal state is not normal, the controller 220 may check information on another communication device in the normal state (operation S410).

When the communication device in the normal state is confirmed, the controller 220 may transmit information on the communication device in the abnormal state and a recovery command signal to the corresponding communication device (the communication device in the normal state).

An operation of the communication device in the normal state, which receives the information on the communication device in the abnormal state and the recovery command signal, will be described with reference to FIG. 5.

Figure 5:
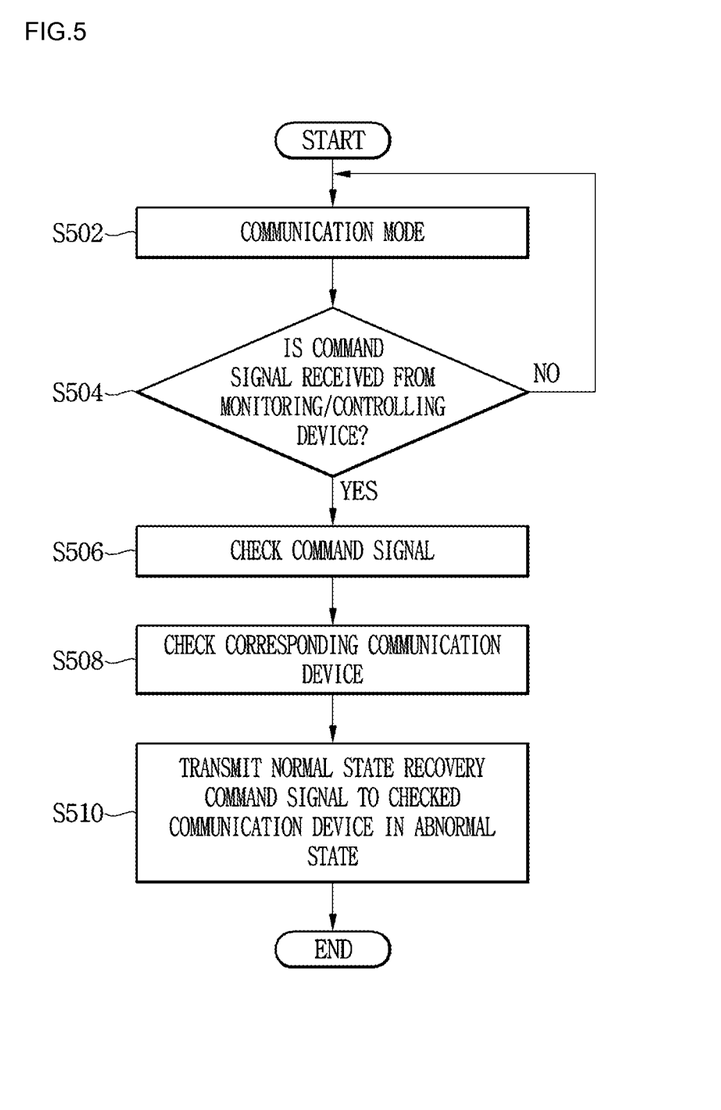
FIG. 5 is a flow chart of an operation of the communication device according to the first embodiment.

FIG. 5 is a flow chart of an operation of the communication device according to the first embodiment.

In an embodiment, the first communication device 110 is exemplarily described as a communication device in the normal state and the second communication device 120 as a communication device in the abnormal state. The first and second communication devices 110 and 120 may be adjacent communication devices existing in a short range communication network connected through short range communication.

Referring to FIG. 5, the first communication device 110 may execute a communication mode in which data acquired from the power facility group 10 is transmitted to the monitoring/controlling device 200 and control data received from the monitoring/controlling device 200 is output to corresponding power facility (operation S502).

The controller 113 of the first communication device 110 may determine whether a specific command signal is received from the monitoring/controlling device 200. The command signal may include information on a specific communication device and a state recovery command message (operation S504).

The controller 113 of the first communication device 110 may check the command signal received from the monitoring/controlling device 200 (operation S506), and check the information on the communication device in the abnormal state and the state recovery command message included in the command signal (operation S506).

The controller 113 may transmit the normal state recovery command signal received from the monitoring/controlling device 200 to the checked communication device in the abnormal state through the first communication unit 111 (operation S510).

The communication device in the abnormal state, which receives the normal state recovery command, may forcibly terminate and reboot the communication device itself on the basis of the normal state recovery command, As described above, embodiments enable an efficient operation of a power system without requiring separate devices or manpower by allowing the communication states and the operation states of devices configuring the power system to be rapidly grasped and controls corresponding thereto to be performed.

A block configuration diagram of a power system to which a second embodiment is applied may be configured identically to that of FIG. 1.

The power system to which the second embodiment is applied may include a power device group 10, at least one communication device 100, and a monitoring/controlling device 200.

The communication device 100 may perform communication with power devices of the power device group 10, and include a communication module capable of communicating with the monitoring/controlling device 200. The communication device 100 according to the second embodiment may include a plurality of communication devices, and each of the plurality of communication devices and the monitoring/controlling device may be connected to a wired communication network or a short range wireless communication network. When executing a wireless communication mode with the monitoring/controlling device, the communication device 100 may perform mutual authentication to execute the wireless communication mode between the authenticated communication device and the monitoring/controlling device 200.

The monitoring/controlling device 200 may receive data of the power device group 10 on the power system 1000 through the communication device 100, create control data, and output the control data to the power device group 10. The monitoring/controlling device 200 may communicate with the communication device 100 through wired communication and short range wireless communication. When the wireless communication with the communication device 100 is performed according to the second embodiment, the monitoring/controlling device 200 may update a session key periodically using a secure key received from the communication device 100. When an error occurs during executing the wired communication mode, the monitoring/controlling device 200 may authenticate the communication device using the session key and change the wired communication mode to a wireless communication mode to operate in the wireless communication mode.

Figure 6:
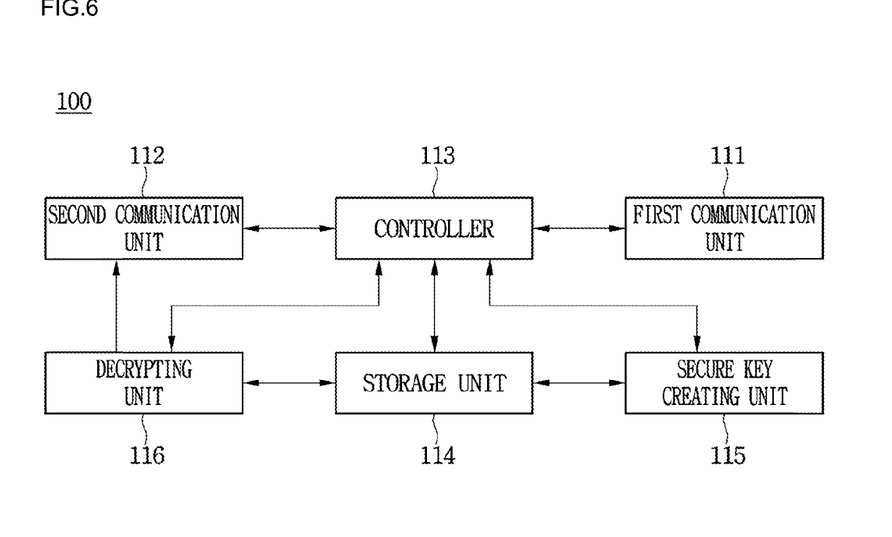
FIG. 6 is a block configuration diagram of a communication device to which a second embodiment is applied.

FIG. 6 is a block configuration diagram of a communication device to which a second embodiment is applied.

Referring to FIG. 6, the communication device 100 according to the second embodiment may include a first communication unit 111, a second communication unit 112, a controller 113, a secure key creating unit 115, a storage unit 114 and a decrypting unit 116.

The first communication unit 111 may include a wired communication module for performing communication with the monitoring/controlling device 200 according to the embodiment. The first communication unit 111 may transmit data acquired from the power device group 10 to the monitoring/controlling device 200 or receive control data to be transmitted to a corresponding power facility of the power device group 10. In addition, the first communication unit 111 according to the embodiment may periodically transmit the secure key to the monitoring/controlling device 200 at the time of executing the wired communication mode.

The second communication unit 112 may include a short range communication module for performing wireless communication among a plurality of communication devices according to the embodiment. The short range communication module capable of configuring the second communication unit 112 may use Bluetooth, Radio Frequency Identification (RFID), infrared data association (IrDA), ultra wideband (UWB), ZigBee, or the like. The second communication unit 112 may be activated to perform communication among the communication devices and with the monitoring/controlling device 200, and execute the wireless communication mode through the second communication unit 112, when an error event such as communication error occurs during executing the wired communication mode with the monitoring/controlling device 200 through the first communication unit 111 according to the embodiment. The second communication unit 112 may transmit and receive authentication data for authentication with the communication device 100 and the monitoring/controlling device 200 at the time of executing the wireless communication mode.

The controller 113 may perform communication among the communication devices and control so as for data received from the monitoring/controlling device 200 to be output to a corresponding destination (power device). When performing wired communication with the monitoring/controlling device 200 according to the embodiment, the controller 113 may create to output a secure key periodically or according to a request by the monitoring/controlling device 200. In addition, when performing wireless communication with the monitoring/controlling device 200, the controller 113 may execute an operation for mutual authentication and when the authentication is completed, execute the wireless communication mode with the monitoring/controlling device 200.

The secure key creating unit 115 may create a secure key provided to the monitoring/controlling device 200. The created secure key is an authentication key to be transmitted to the monitoring/controlling device 200 and may be transmitted to the monitoring/controlling device 200 periodically or by a request by the monitoring/controlling device 200.

The storage unit 114 may store information on the power device group 10 and the monitoring/controlling device 200. The storage unit 114 may store certificate and information on the secure key created by the secure key creating unit 115. The storage unit 114 may store the session key acquired from the monitoring/controlling device 200.

The decrypting unit 116 may decrypt encrypted data transmitted from the monitoring/controlling device 200.

Figure 7:
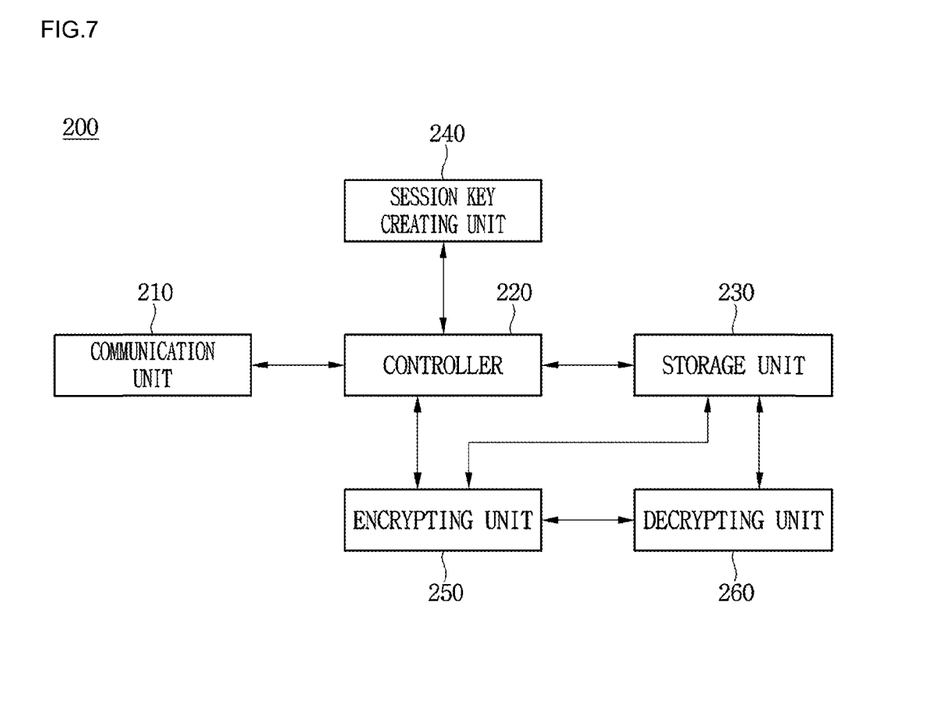
FIG. 7 is a block configuration diagram of a communication device to which the second embodiment is applied.

FIG. 7 is a block configuration diagram of the monitoring/controlling device to which the second embodiment is applied.

Referring to FIG. 7, the monitoring/controlling device 200 according to the second embodiment may include a communication unit 210, a session key creating unit 240, an encrypting unit 250, a controller 220, a storage unit 230, and a decrypting unit 260.

The communication unit 210 may include at least one communication device and wired and wireless communication modules connectable in wired and wireless manners respectively. The communication unit 210 may transmit data acquired through the communication device to a preset destination (an external terminal device or the like). The communication unit 210 may receive information on the communication device and a secure key for authentication at the time of executing a wireless communication mode. In addition, the communication unit 210 may transmit information on a session key created in the session key creating unit 240 to a corresponding communication device through the secure key. The communication unit 210 may perform wireless communication with an authenticated communication device on the basis of controls of the controller 220.

The session key creating unit 240 may create a certificate received from the communication device 100 and the session key corresponding to the secure key. The session key creating unit 240 may acquire the secure key from the communication device 100 periodically or on the basis of the controls of the controller 220, and create the session key in correspondence to the acquisition of the secure key.

The encrypting unit 250 may encrypt the session key created by the session key creating unit 240 and authentication data. The encrypting unit 250 may encrypt the session key created in correspondence to the secure key received from each communication device and the authentication data on the basis of the controls of the controller 220, and allow the encrypted data to be output to a corresponding communication device through the communication unit 210 on the basis of the controls of the controller 220.

The controller 220 may check the certificate and encryption key received from the communication device periodically or at a specific time during executing the wired communication mode with the communication device 100, and control so as for the session key corresponding to the encryption key to be created in the session key creating unit 240. The controller 220 may transmit the session key created by the session key creating unit 240 with the authentication data to a corresponding communication device. When an abnormal communication state is detected during executing the wired communication mode, the controller 220 may change the wired communication mode into the wireless communication mode, and authenticate a corresponding communication device on the basis of a pre-stored or updated session key.

The storage unit 230 may store information on each communication device and the session key created in correspondence to the communication device. The session key may be updated periodically or at every specific time on the basis of the controls of the controller 220.

The decrypting unit 260 may decrypt encrypted data received from the communication device. The decrypting unit 260 may receive data of the power device group 10 periodically or in a real time and the encrypted data from the communication device 100, and decrypt the received data. When the encrypted secure key and authentication data are received from the communication device 100, the decrypting unit 260 may decrypt the corresponding data to create the session key and output the decrypted data to the controller 220.

An operation of the monitoring/controlling device according to the second embodiment will be described in detail on the basis of the above-described configuration with reference to the drawings below.

Figure 8:
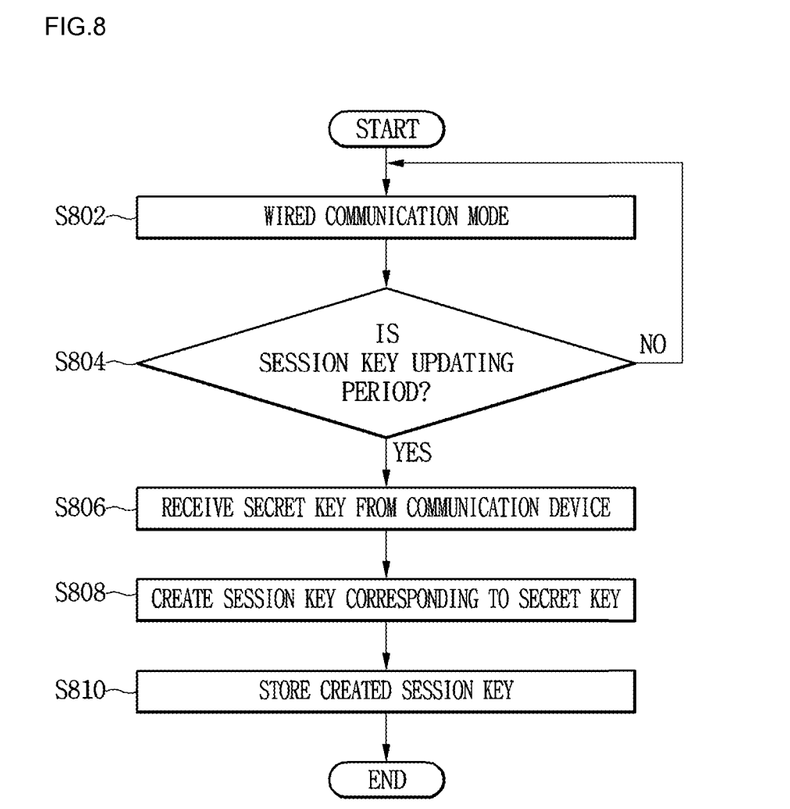
FIG. 8 is a flow chart of an operation for executing a wireless communication mode of the monitoring/controlling device according to the second embodiment.

FIG. 8 is a flow chart of an operation for executing the wireless communication mode of the monitoring/controlling device according to the second embodiment.

Referring to Fig, 8, the monitoring/controlling device according to the embodiment may execute a wired communication mode with at least one communication device, and acquire data received from the power device group 10 according to the wired communication mode (operation S802). At this point, the monitoring/controlling device 200 may receive a secure key and authentication data from a corresponding communication device periodically or at the time of receiving the data of the power device group 10.

The controller 220 of the monitoring/controlling device 200 may check the secure key and authenticated data received from the communication device 100, and determine whether to update the session key at a predetermined time (period) or at the time of receiving the secure key and authentication data (operation S804). In the embodiment, updating information on a pre-stored session key at every predetermine period is exemplarily described.

The controller 220 may determine whether a pre-stored session key update period of the communication device is arrived (operation S804). When the session key update period is arrived, the controller 220 may check the secure key and authentication data received from the communication device (operation S806), and allow a session key for the corresponding communication device 100 to be created in the session key creating unit 240 (operation S808).

The controller 220 may store the session key created by the session key creating unit 240 and corresponding to the communication device 100 in the storage unit 230 (operation S810). At this point, the controller 220 may transmit information on the created session key to the corresponding device 100.

Figure 9:
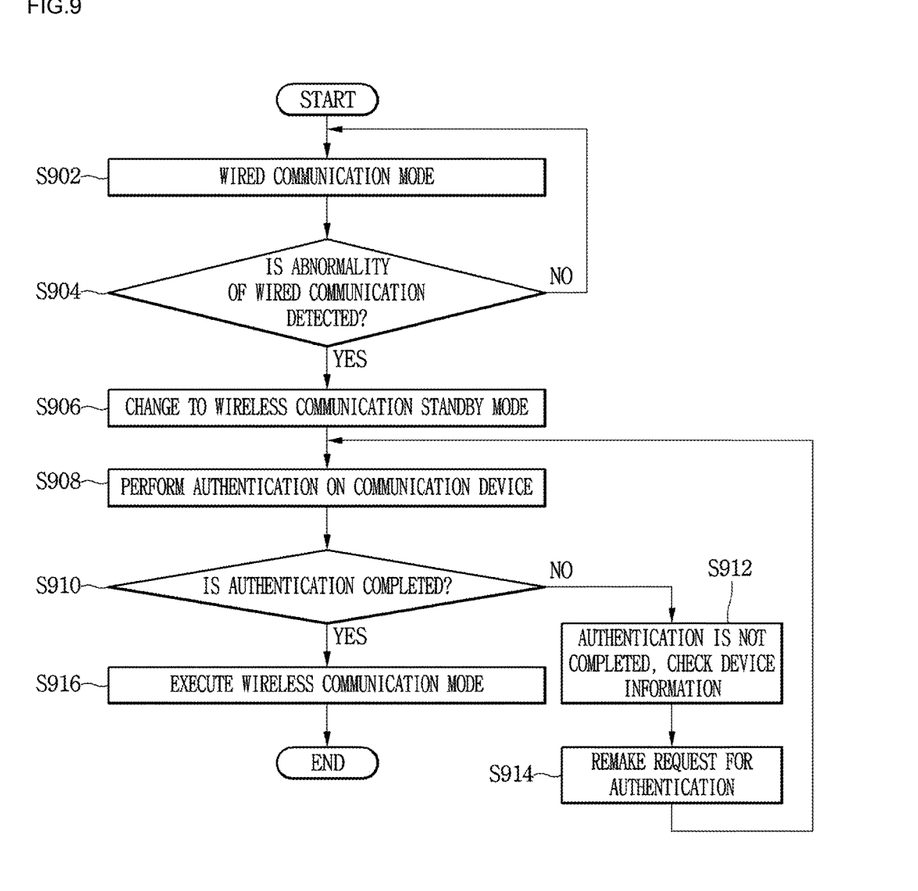
FIG. 9 is a flow chart of an operation in the wireless communication mode of the monitoring/controlling device according to the second embodiment.

According to the above-described operation, description will be provided in detail about an authenticating operation with the communication device using the session key created by the monitoring/controlling device 200 with reference to FIG. 9.

FIG. 9 is a flow chart of an operation in the wireless communication mode of the monitoring/controlling device according to the embodiment.

Referring to FIG. 9, the monitoring/controlling device 200 may acquire data received from the power device group 10 through the wired communication mode with the communication device 100, and receive the authentication data and the secure key periodically, at every specific time, or together with the data of the power device group 10 (operation S902).

The controller 220 of the monitoring/controlling device 200 determines whether a wired communication state of the monitoring/controlling device 200 or a specific communication device is abnormal at the time of executing the wired communication mode (operation S904). When the abnormality of the wired communication is detected, the controller 220 may change the wired communication mode to a standby mode for the wireless communication (operation S906). The abnormality of the wired communication may be detected by non-reception of or errors in data received from a corresponding communication device, or by a wired communication error of the monitoring/controlling device 200.

With the change to the standby mode for the wireless communication mode, the controller 220 may perform mutual authentication for wireless communication with the corresponding communication device on the basis of the pre-stored session key of the communication device. The authentication with the corresponding communication device for the wireless communication may be performed by an authentication protocol using the known session key and secure key.

The controller 220 may check whether authentication of the corresponding communication device is completed using the pre-stored session key (operation S910), and for a communication device for which the authentication is not completed, check information (the session key and the like) on the corresponding communication device (operation S912) to request re-authentication or remake a request for the secure key and authentication data (operation S910).

On the contrary, when the authentication for the corresponding communication device is completed, the controller 220 may change the communication mode from the wired communication mode to the wireless communication mode, and receive data of the power device group 10 through the corresponding communication device or output control data to the corresponding power device group 10.

As described above, embodiments enable an efficient operation of a power system without requiring separate devices or manpower by allowing communication states and operations states of devices configuring the power system to be rapidly grasped and controls corresponding thereto to be performed.

In addition, embodiments enable reliability of devices configuring the power system to be secured, security for transmission and reception data to be maximized, and accordingly the efficient power system to be operated.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power system comprising:
a power device group comprising a power device;
at least two communication devices connected to the power device group via a short range communication network; and
a monitoring/controlling device connected to the at least two communication devices via a wired connection and transmitting and receiving state information data and control data of the power device via the at least two communication devices,
wherein the at least two communication devices each comprise:
a first communication unit connecting the at least two communication devices via the short range communication network; and
a second communication unit connected to the monitoring/controlling device via a wired connection,
wherein the monitoring/controlling device comprises:
a communication unit connected to each of the at least two communication devices;
a storage unit storing information related to each of the at least two communication devices and a recovery command message according to a state of each of the at least two communication devices; and
a controller checking the state of each of the at least two communication devices and outputting the recovery command message to the corresponding communication device when the corresponding communication device is in an abnormal state, and
wherein the corresponding communication device that is in the abnormal state receives the recovery command message and forcibly terminates and reboots itself based on the recovery command message.

2. The power system according to claim 1, wherein each of the at least two communication devices receives a state recovery message and information related to the corresponding communication device that is in the abnormal state from the monitoring/controlling device via the corresponding second communication unit during normal state operation, checks the corresponding communication device that is in the abnormal state, and outputs the state recovery message via the corresponding first communication unit.

3. The power system according to claim 1, wherein the controller outputs the recovery command message to the corresponding communication device that is in the abnormal state when a communication state of the corresponding communication device is normal.

4. The power system according to claim 1, wherein the controller outputs information related to a first communication device that is in the abnormal state and the recovery command message to a second communication device that is in a normal state and connected to the first communication device when a communication state of the first communication device is abnormal.

* * * * *